Feb. 6, 1940. W. O. MAURER 2,189,496
FISHHOOK
Filed Dec. 23, 1938
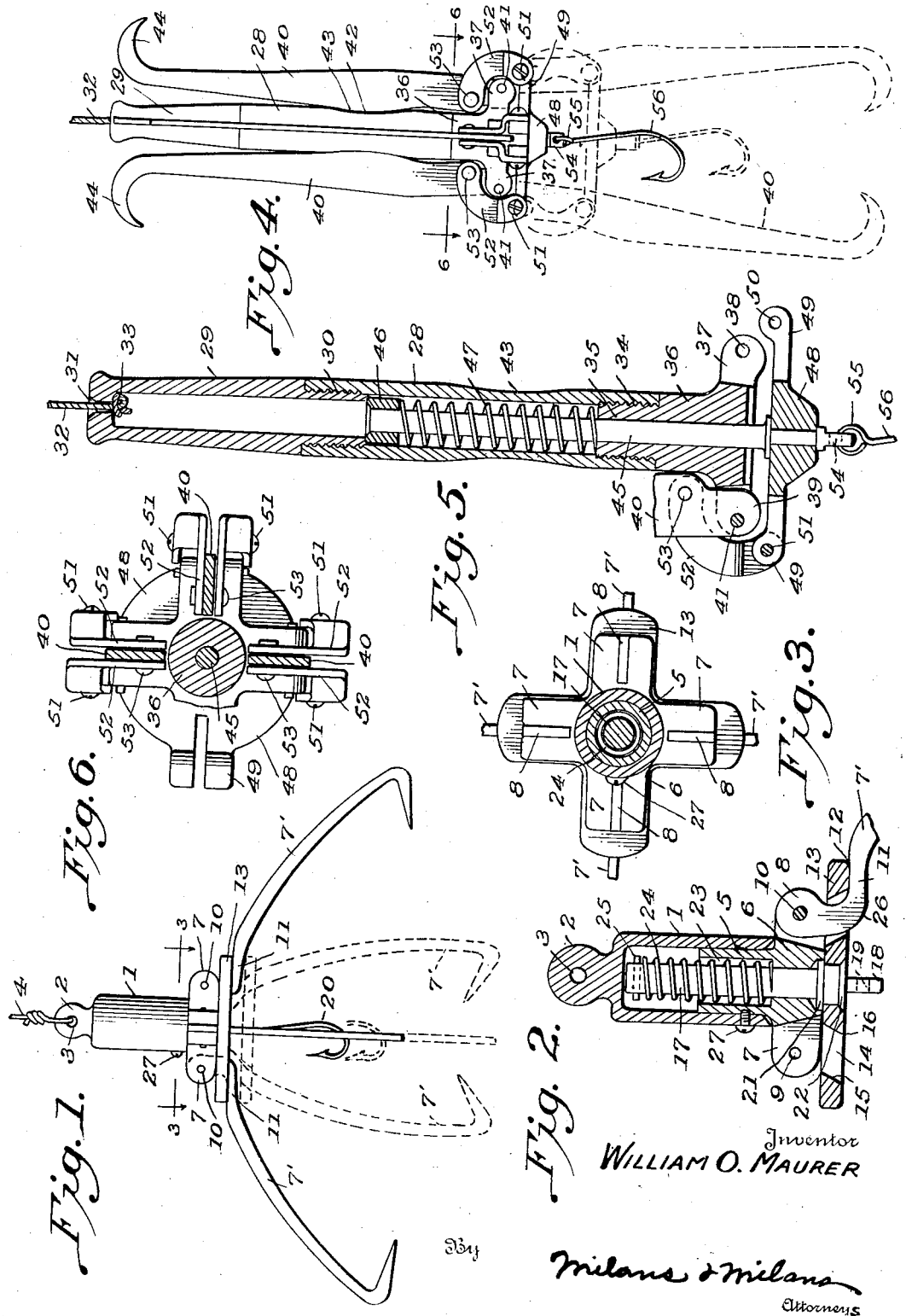
Inventor
WILLIAM O. MAURER
Milans & Milans
Attorneys Patented Feb. 6, 1940

2,189,496

UNITED STATES PATENT OFFICE 2,189,496

FISHHOOK

William O. Maurer, Cincinnati, Ohio, assignor to George H. Hutaff, Jr., Wilmington, N. C.

Application December 23, 1938, Serial No. 247,472

10 Claims. (Cl. 43—89)

My invention relates to new and useful improvements in a fishhook or snare and has for its principal object the provision of a device of the character described which is relatively simple and inexpensive in construction while at the same time being efficient in its operation for the work required.

A further object of the invention resides in the provision of a fishhook or snare in which a plurality of gripping jaws or arms are operated or moved into gripping position by a pull on the line and bait hook, the member to which the bait hook is connected being adapted to move relative to the member to which the line is attached.

Another object of the invention consists in the provision of a device of the character described in which the gripping jaws or arms are normally positioned to permit a fish to grab the bait carried by the bait hook but which are operated or drawn into engaging position by pulling on the bait hook or line, the jaws or arms being provided at their normally free ends with relatively sharp hook portions adapted to be engaged in the fish.

A still further object of the invention resides in the provision of spring means normally positioning the parts so that the gripping arms or jaws are held in what might be termed spread or inoperative position, the normal positon of the spring means being overcome when a pull is placed on the bait hook or line so as to swing the arms or jaws into fish-engaging position.

With the above and other objects in view, which will appear as the description proceeds, my invention consists in the novel details of construction and arrangement of parts which will be described in the following specification and illustrated in the accompanying drawing, and while I have illustrated and described the preferred embodiments of the invention, as they now appear to me, it will be appreciated that such changes may be made as will fall within the scope of the appended claims.

In the drawing:

Fig. 1 is a side elevation with the gripping jaws or arms shown in their spread position by full lines and in their gripping positions in dotted lines.

Fig. 2 is a fragmental transverse vertical section with parts shown in elevation.

Fig. 3 is a horizontal section on the line 3—3 of Fig. 1 looking in the direction of the arrows.

Fig. 4 is a side elevation of a slightly modified form of the invention with the gripping arms or jaws shown in their normal positions by full lines and in their gripping positions by dotted lines.

Fig. 5 is a transverse vertical section with parts shown in side elevation and parts removed; and Fig. 6 is a horizontal section on the line 6—6 of Fig. 4 looking in the direction of the arrows.

In that form of the invention shown in Figs. 1, 2 and 3 of the drawing the gripping jaws or arms are adapted to normally be held in the position shown in full lines in Fig. 1, but when parts are operated in a manner to be later described the arms or jaws will be swung into the gripping positions shown by dotted lines in Fig. 1. In that form of the invention disclosed in Figs. 1, 2 and 3 of the drawing a casing or housing open at what may be termed its lower or inner end is shown at 1 and is formed on what might be termed its upper or outer end with a knob or projection 2 having the transverse opening 3 in which one end of the line 4 is adapted to be attached, as shown quite clearly in Fig. 1.

Inserted in the open end of the casing or housing 1 is the shank portion 5 of the member 6 having outwardly directed horizontal lugs or ears indicated at 7, the ears of each pair being spaced apart slightly to receive the upper ends 8 of the gripping jaws or arms 7'. Each pair of ears is formed with a transversely extending opening 9 to receive a pin 10 which also passes through the end 8 of the associated arms 7' whereby the arms are pivotally connected to the ears for swinging movement as will be later brought out. Adjacent its pivot point each of the arms or jaws is curved outwardly as shown at 11 to provide what might be termed a normally horizontally extending edge portion 12 adapted to be engaged by a plate 13 having the circumferentially spaced openings 14 through which the arms or jaws extend as is quite clearly illustrated in Fig. 2 of the drawing. Each of the openings 14 is formed with the oppositely disposed beveled surfaces 15 and 16 for a purpose which will be later brought out.

Carried by the plate 13 is an upwardly directed rod 17 which is formed on what might be termed its lower or outer end with a projection 18 having an opening 19 therein, this opening 19 providing means for connecting the bait hook 20 to the rod. As shown more particularly in Fig. 2 of the drawing the rod 17 is connected to the plate 13 by passing the same through an opening in the plate and offsetting portions to provide the collars 21 and 22. The rod 17 is slidable through the member 6 and extends into the casing or housing 1. The shank portion 5 of the member 6 is formed with the pocket or recess 23 to receive the lower end of the coiled spring 24 which surrounds the rod 17, the upper end of the coiled spring being engaged by the transversely extending pin 25 passing through an opening in the rod 17, adjacent its upper or inner end. The coiled spring normally holds the rod in its inner-most position with the plate 13 engaging the end of the member 6 and the arms or jaws 7' spread apart as shown more particularly by full lines in Fig. 1 of the drawing.

In that form of the invention just described it will be understood that bait will be carried by the hook 20 and when a fish grabs the hook and starts to pull away the line 4 will become taut to hold the casing or housing 1. Further pull on the hook 20 will draw the plate 13 outwardly and place the coiled spring 24 under tension. The movement of the plate 13 will swing the gripping arms or jaws into the dotted line position shown in Fig. 1, it being understood that the beveled edge portions 15 of the openings 14 will ride over the outer edges of the arms or jaws 7. When pull is released the spring 24 will return the parts to their normal positions it being understood that the beveled edge portions 16 of the openings 14 will engage the curved portions 26 of the arms or jaws 7' to swing the same outwardly into their full line positions shown in Fig. 1. The shank portion 5 of the member 6 will be held in the casing or housing 1 by means of the screw 27 or other suitable fastening.

In that form of the invention disclosed in Figs. 4 to 6 inclusive of the drawing a casing or housing is provided and is shown as formed of the sections 28 and 29 normally secured together with the threaded connection shown at 30. The upper or outer end of the section 29 is closed and formed with the opening 31 through which the end of the line 32 passes and is knotted as shown at 33. What might be termed the lower or outer end of the section 28 is interiorly threaded as shown at 34 to receive the threaded shank portion 35 of the member 36 formed with the outwardly directed circumferentially spaced pairs of ears 37 formed with the transversely extending openings 38. Positioned between the ears of each pair 37 is the one end 39 of the gripping arms or jaws 40, the ends of the arms or jaws being pivotally connected to the ears by the transversely extending pins 41 which pass through the openings 38. Normally the arms or jaws 40 will extend vertically, as shown more particularly in Fig. 4 of the drawing, one edge portion of each of the jaws being outwardly curved as shown at 42 to fit into the dished portion 43 of the section 28 of the casing or housing. Each of the arms or jaws is formed on that end opposite to its pivoted end with a hooked portion 44.

A rod 45 is slidably mounted in the member 36 and its shank portion 35 and is provided on its inner end, which projects into the casing or housing, with a ring 46 which forms an enlargement adapted to engage the inner end of the section 29 of the casing or housing as is quite clearly illustrated in Fig. 5 of the drawing. A coiled spring 47 surrounds the inner end of the rod 45, between the ring 46 and the end of the shank 35 of the member 36, this coiled spring normally urging the rod inwardly with the ring 46 in engagement with the end of the section 29 of the housing or casing.

Connected to the outer end of the rod 45 is a plate 48 having the outwardly directed pairs of ears shown at 49, the ears being provided with the transversely extending openings 50 to receive the pins 51 which pivotally connect the links 52 to the ears, the links being arranged in pairs, as shown more particularly in Fig. 6 of the drawing to straddle the ears of the separate pairs and to receive therebetween the lower ends of the arms or jaws 40 as is more clearly shown in Figs. 5 and 6 of the drawing, the links in turn being pivotally connected to the arms or jaws by the transversely extending pins 53. The links 52 are of the curved formation shown more particularly in Figs. 4 and 5 of the drawing so that when the rod 45 is slid outwardly with respect to the casing or housing it will carry with it the plate 48 and links 52, the downward pull on the links 52 drawing the arms or jaws 40 outwardly and swinging them downwardly into the dotted line positions shown more particularly in Fig. 4 of the drawing. When in the dotted line positions the hook portions 44 of the arms or jaws will engage and hold the fish. The parts will be returned to their normal full line positions through means of the coiled spring 47. The outer end of the rod 45 is formed with the projection 54 having an eye to receive the eye portion 55 of the bait hook 56. In use the fish will snap the bait carried by the bait hook 56 and when it starts to move away will draw outwardly on the rod 45, the line 32 being placed under tension.

It will be noted that in each form of the invention disclosed the gripping arms or jaws are normally held in position so that they will not interfere with a fish grabbing the bait on the bait hook. At the same time each form of the invention includes a housing or casing having a member connected thereto and forming pivotal means for the ends of the gripping arms or jaws, the the gripping arms or jaws being operated by a plate or member carried by a rod which is operable in the member carried by the casing or housing. With the construction disclosed the parts may be readily assembled or disassembled making it possible to construct the device in a simple inexpensive manner and aid in performing the work or functions which have been described above.

Having fully described my invention what I claim as new and desire to secure by Letters Patent is:

1. A fishhook including a housing, gripping jaws pivotally connected to the housing, a rod slidably mounted relative to the housing, a spring positioned within the housing, for normally holding the rod in its inner-most position, and a member carried by the rod and adapted for swinging the gripping jaws upon movement of the rod relative to the housing.

2. A fishhook including a housing, ears projecting laterally from the housing, gripping jaws pivotally connected to the ears, a rod adapted for sliding movement relative to the housing, a spring positioned within the housing for normally urging the rod to its inner-most position, and a plate carried by the rod for swinging the gripping jaws upon movement of the rod relative to the housing.

3. A fishhook including a housing formed of a hollow section closed at one end and a removable member having a portion insertable in the opposite end, gripping jaws pivotally connected to the removable member, a rod slidably mounted in the removable member, a spring mounted in the housing, for normally holding the rod in its inner-most position, and means carried by the rod for swinging the pivoted jaws upon movement of the rod relative to the housing.

4. A fishhook including a housing formed of a hollow section closed at one end and a removable member having a portion insertable in the opposite end, gripping jaws pivotally connected to the removable member of the housing, a rod slidably mounted in the removable member of the housing, a spring positioned within the housing and normally holding the rod in its inner-most position, and a plate carried by the rod, said plate having openings therein through which portions of the gripping jaws extend, the gripping jaws being swung by the plate upon movement of the rod relative to the housing.

5. A fishhook including a housing, a rod slidably mounted in the housing, a spring normally urging the rod to its inner-most position, gripping jaws pivotally connected to the housing, and a plate carried by the slidable rod, said plate having openings therein through which portions of the gripping jaws extend, the gripping jaws being swung by the plate upon movement of the rod relative to the housing.

6. A fishhook including a housing, gripping jaws pivotally connected to the housing, a rod slidably mounted relative to the housing, a plate carried by the rod, and a spring positioned within the housing and normally urging the rod to its inner-most position with the plate carried by the rod holding the gripping arms in spread position, the gripping arms being swung into gripping position by movement of the rod and plate relative to the housing.

7. A fishhook including a housing, ears projecting laterally from the housing, gripping jaws pivotally connected to the ears, a rod slidably mounted relative to the housing, a spring mounted in the housing and normally holding the rod in its inner-most position, a plate carried by the rod, and links connecting the plate with the gripping jaws, the gripping jaws being swung on their pivots upon movement of the plate relative to the housing.

8. A fishhook including a housing, ears projecting from the housing, gripping jaws pivotally connected to the ears and normally parallel with the housing, a rod slidably mounted relative to the housing, a spring for normally urging the rod to its inner-most position, a plate carried by the rod, and arcuate-shaped links connecting the plate and gripping jaws, the gripping jaws being swung from their parallel position with the housing into gripping position upon movement of the plate and rod relative to the housing.

9. A fishhook including a member to which a line is adapted to be connected, jaws pivotally connected to the member, a rod slidable relative to the member, a spring surrounding the rod and normally holding the same in its inner-most position relative to the member, a plate carried by the rod and adapted for operating the gripping jaws upon movement of the rod relative to the member, and a bait hook carried by the rod.

10. A fishhook including a housing, a removable member having a portion insertable in the housing, gripping jaws pivotally connected to the removable member, a rod slidably mounted in the removable member, a spring mounted in the housing for normally holding the rod in its innermost position, and means connecting the gripping jaws and the rod, said means being operable by movement of the rod relative to the housing for swinging the pivoted jaws.

WILLIAM O. MAURER.